United States Patent [19]

Geiser

[11] Patent Number: 5,320,010

[45] Date of Patent: Jun. 14, 1994

[54] GUIDE BAR TUBE FOR AUTOMATIC LATHE

[75] Inventor: Markus Geiser, Preles, Switzerland

[73] Assignee: SAMECA SA, Lamboing, Switzerland

[21] Appl. No.: 982,855

[22] Filed: Nov. 30, 1992

[51] Int. Cl.5 ............................................. B23B 13/02
[52] U.S. Cl. ........................................ 82/127; 414/18
[58] Field of Search ................. 82/124, 125, 126, 127, 82/163; 414/18

[56] References Cited

U.S. PATENT DOCUMENTS 3,889,822  6/1975  Ross ...................................... 414/18
4,889,024 12/1989  Geiser et al. ........................... 82/127

FOREIGN PATENT DOCUMENTS 2012232  7/1979  United Kingdom .

Primary Examiner—William E. Terrell
Attorney, Agent, or Firm—Richard Linn

[57]     ABSTRACT

The invention relates to a guide-bar tube for an automatic lather. The guide-bar tube includes a centering traveler comprising balls distributed in two parallel planes in a manner which allows the centering traveler to be locked either to the guide-bar tube or to the rod of a feed piston. This arrangement allows the displacement of the feed piston both for advancing the bar stock towards the lather and for retraction of the piston towards the rear of the device by vacuum. The presence of the traveller, which is normally mounted on the rod of the feed piston, eliminates buckling and floating of the bar stock and of the feeder rod in the guide-bar tube. This structure results in a considerable increase in the number of turns of the bar and a great reduction of noise.

8 Claims, 3 Drawing Sheets

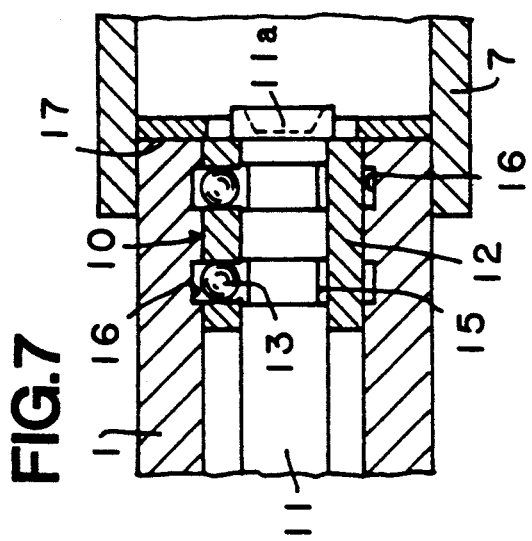
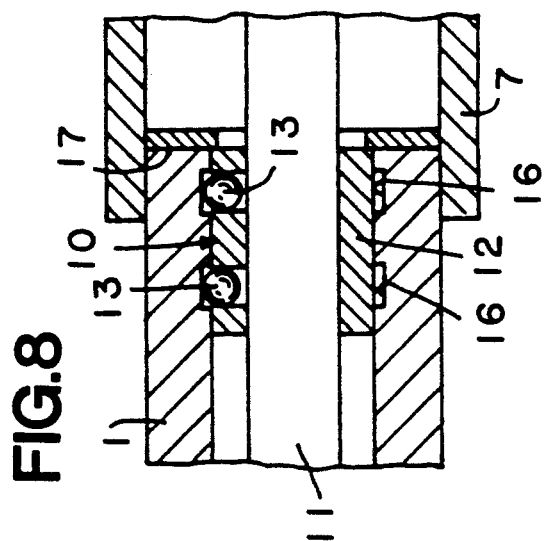
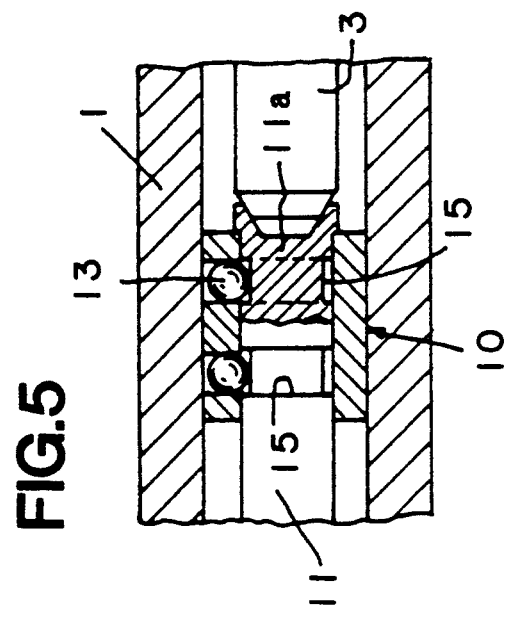
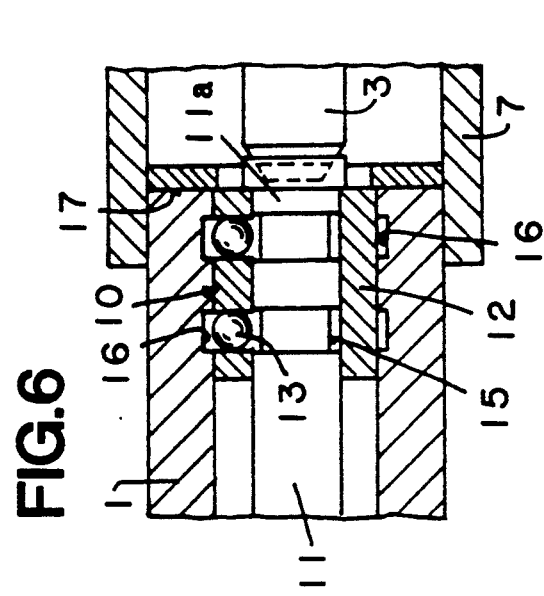
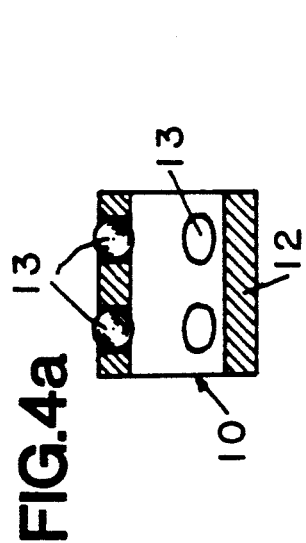
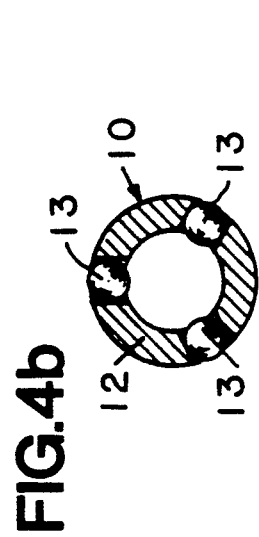
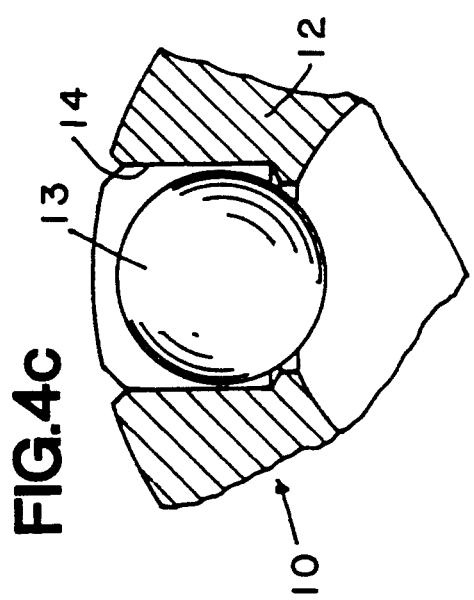

GUIDE BAR TUBE FOR AUTOMATIC LATHE

The present invention refers to a guide-bar tube for an automatic single and/or multiple spindle lathe, comprising a feed piston, whose diameter is equal to or smaller than that of the bar stock to be machined, in order to feed said bar towards the lathe.

BACKGROUND OF THE INVENTION

In the machining operation of the bars in automatic lathes, said bars tend to buckle in the guide-bar tubes and/or in the headstock of the lathe. This buckling occurs more particularly at high rotational speeds of said bars due to the fact that the latter have a great length and a relatively small diameter. The risk of buckling is enhanced when the bar is being pushed towards the headstock of the lathe. Due to this buckling (FIG. 1), bar 3 will float in guide-bar tube 1 and in the headstock of the lathe. Said floating of the bar creates balance errors and vibrations which are transmitted up to the headstock of the lathe, thus producing inexactitudes in the machining of the bar, such as concentricity errors, ovalities and surface quality defects of the machined pieces. FIG. 1 shows a device where bar 3 is free between the head 11a of feed piston 2 and chuck 5 of the lathe. This is the most unfavorable case since the length of deformation is maximum. FIG. 2 shows the effect of a centering ring which is disposed between the exit of guiding tube 1 and the entry of head stock 4. Such a centering ring is the object of U.S. Pat. No. 4,507,992 of the same inventor. Said centering ring 7 provides an improvement in that bar 3, which is held by the chuck of the lathe while being centered and supported at the rear by the feed piston, is kept from floating at the location of ring 7. In this case, however, the bar can still be floating between feed piston 2 and ring 7 and between the latter and the chuck of the lathe, respectively.

The ideal solution would consist in guiding the bar over its entire length in the headstock of the lathe by a headstock reducing sleeve corresponding to the material diameter and by a hydrodynamic guide-bar tube whose internal diameter is dimensioned optimally with respect to the diameter of the bar to be guided. Such a solution, however, is difficult to apply in practice, since it would require a guiding tube for each diameter and each profile of bars to be machined, which entails costs and start-up times which are inacceptable in practice.

FIG. 3 suggests still another improvement which consists in placing a headstock reducing sleeve 8 between centering ring 7 and headstock 4 of the lathe. This procedure is being used by the inventor in the device which is the object of European Patent Application No. 88810416.3. This principle has the drawback that the diameter of the feed piston must be equal to or smaller than that of the bar to be machined in order to allow the penetration of said feed piston through the centering ring and into reducing sleeve 8 of headstock 4 of the lathe. In this case, bar 3 with the feed piston may still float in guiding tube 1 whose internal diameter is greater than that of the bar and of the feed piston, respectively.

Also, a telescopic guide-bar device is known from German published application No. 25 33 502, said device having an outer tube which is slidable in a fixed tube of the device, a feed piston rod being slidable in said external tube. Said feed piston rod is provided at its front end with a head which bears against the rear portion of the bar to be machined in order to feed it towards the headstock of the lathe. The diameter of the head is smaller than that of the spindle and of the centering ring which is disposed at the entry of the headstock, such that said head can penetrate into the headstock. The telescopic principle allows to reduce the longitudinal dimension of the device. However, the device according to the abovementioned document is relatively complicated and expensive in conception. The advance of the bar to be machined is controlled pneumatically, without providing a hydrodynamic bearing for supporting the bar, and the rotational speed of the latter is thus limited.

SUMMARY OF THE INVENTION

Consequently, the present invention aims to find a simple and economical means allowing the use of a guide-bar tube which is capable of receiving a plurality of bar diameters and/or profiles, equipped with a feed piston whose external head diameter is equal to or smaller than that of the smallest machined bar which is guided in said tube, in order to allow said feed piston to penetrate through a ring and into said headstock reducing sleeve, while ensuring that said feeder is maintained in the center of the guide-bar tube without floating in order to support and center said bar when it is engaged in the guide-bar tube. This problem is solved by a device wherein said feed piston is provided with a centering traveller having means for fastening it to the front portion of said feed piston as long as the head of the latter is engaged in the guide-bar tube and for fastening it to the front portion of the guide-bar tube when said head of said feed piston penetrates into the headstock of the lathe. The presence of a travelling ring or centering traveller allows to firmly hold the rear portion of the bar to be machined and to avoid any floating of the feed piston in the guide-bar tube as well as any floating of the rear portion of the bar which is in contact with the feed piston.

SHORT DESCRIPTION OF THE DRAWING

The invention will be described in more detail hereinafter with reference to the drawing wherein:

FIGS. 1, 2, and 3 show known solutions of the prior art;

FIGS. 4a, 4b, and 4c show a longitudinal section, a cross-section, and the mounting of a ball of a centering traveller according to the invention;

FIGS. 5, 6, 7, and 8 show different states of the centering traveller; and

FIGS. 9, 10, and 11 show different positions of the feed piston, corresponding to the states of FIGS. 5, 6, and 8, respectively.

DETAILED DESCRIPTION OF THE INVENTION

Figure 1:
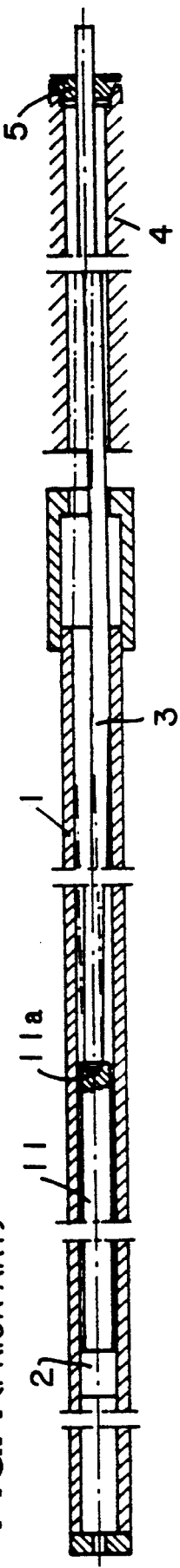
Figure 2:
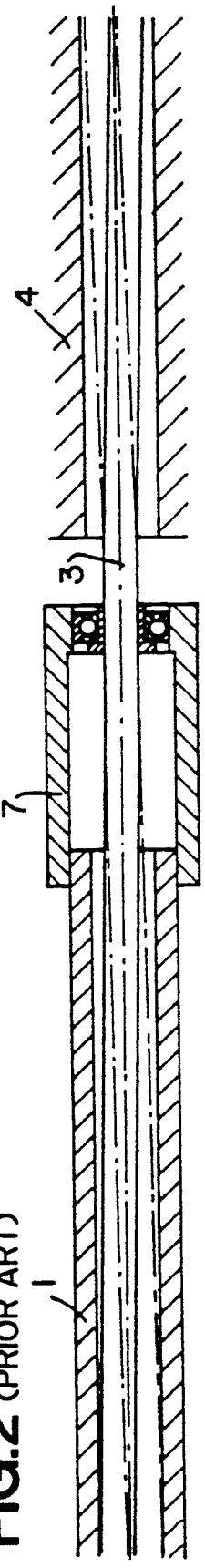
Figure 3:
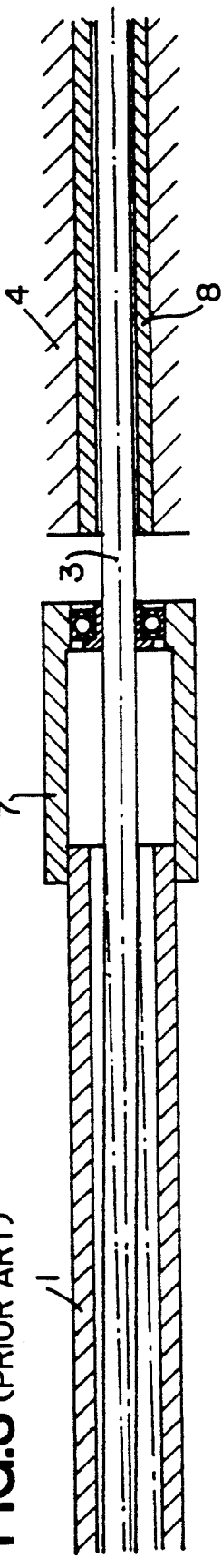

FIG. 4 shows the centering traveller in a longitudinal section (4a), in a cross-section (4b), as well as the detail of the mounting of a ball 13 in its housing (4c). The centering traveller 10 comprises a sleeve 12 carrying floating elements, for example balls 13 which are mounted in radial bores of said sleeve. Said balls are allowed to move freely radially in said bores 14 of said sleeve in the direction of the axis of said bores. In the illustrated example, balls 13 are divided into two groups of three in parallel planes. In each plane, the three balls are angularly spaced by 120°. This arrangement corresponds to the preferred embodiment, but it is not limitative. FIG. 4c shows how ball 13 is held in its housing with a clearance in the direction of the axis of bore 14.

Figure 9:
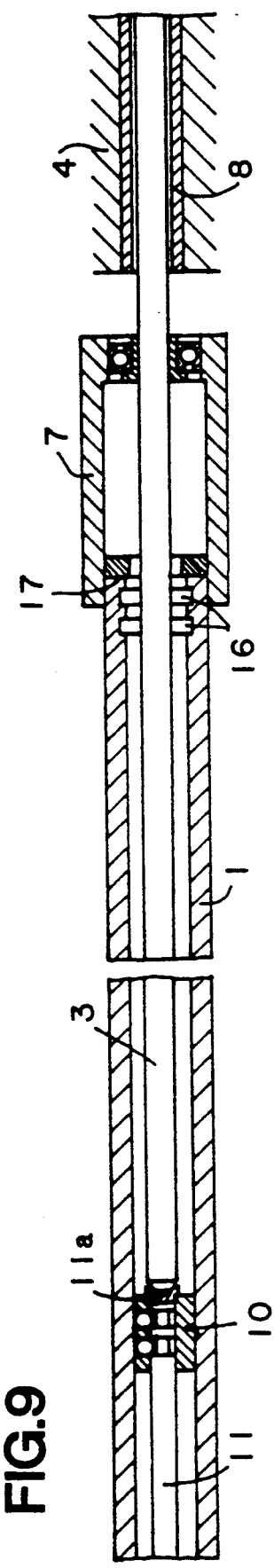

Centering traveller 10 is intended to be mounted on the rod of feed piston 2 or on head 11a of the latter. FIG. 5 shows one state of the centering traveller wherein the latter is fastened to the rod 11 of feed piston 2, said traveller possibly being fastened to head 11a of the feed piston as well. FIG. 9 shows the rod 11 of feed piston 2 which feeds bar 3 towards the lathe. On the other hand (FIG. 5), centering traveller 10 is shown while locked to rod 11 of feeder 2 by means of balls 13 which are engaged in grooves 15 at the surface of rod 11 of feeder 2. Moreover, FIG. 9 shows grooves 16 in the internal surface of the front portion of the guide-bar tube. Said grooves 16 allow to unlock centering traveller 10 from rod 11 of feeder 2.

Figure 10:
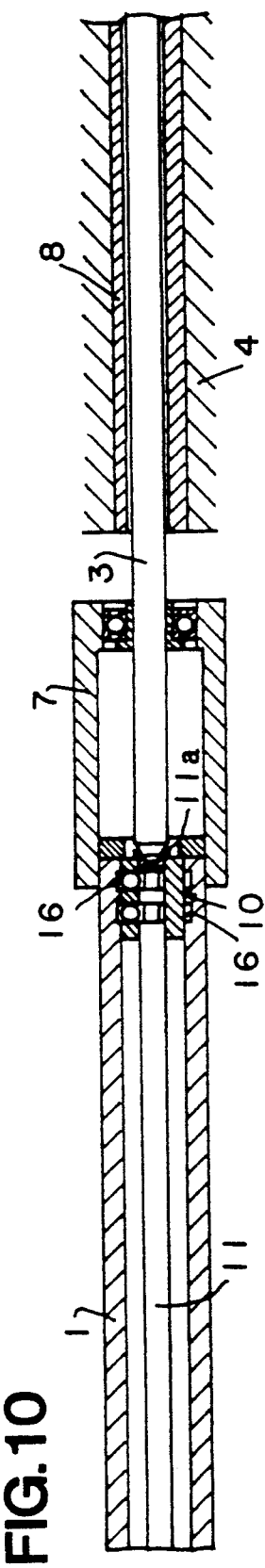

FIG. 6 (see also FIG. 10) shows one condition where centering traveller 10 is in contact with a stop 17 at the end of guide-bar tube 1. The advance of the feed piston causes balls 13 to pass from grooves 15 of rod 11 of feeder 2 to grooves 16 of guide-bar tube 1. Hence, centering traveller 10 is locked to the front portion of guide-bar tube 1, and the rod of the feeder is allowed to continue its course and penetrate into the headstock of the lathe in order to allow the advance of the material until the bar is completely machined.

Figure 11:
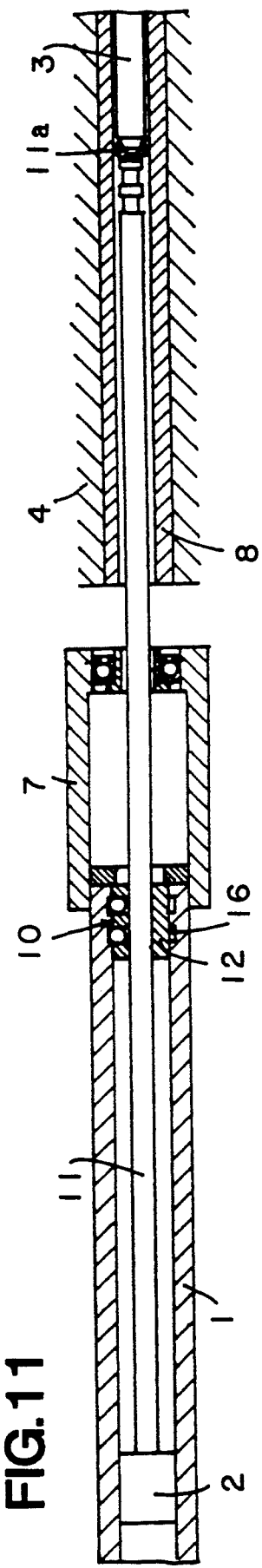

FIG. 8 (see also FIG. 11) shows a state where traveller 10 is attached to guide-bar tube 1 and locked thereto by means of balls 13 which are engaged in grooves 16 of said tube.

When the bar is completely machined, feed piston 2 is retracted to the rear of the device. As it arrives at the position according to FIG. 7, the feeder head 11a, whose external diameter is greater than the internal diameter of centering traveller 10, comes to bear against the latter, which is unlocked from guide-bar tube 1 by balls 13 which are passing from grooves 16 of the guide-bar tube to grooves 15 of the feeder rod 11.

The foregoing shows that head 11a of feeder 2 is always perfectly centered by means of traveller 10, even if the diameter of the feeder head is substantially smaller than that of the guide-bar tube. Consequently, the rear of bar 3 is perfectly centered by head 11a of feed piston 2.

On one hand, this allows an increased range of diameters of the bars to be received in the guide-bar tube, while using a feeder of small diameter which is capable of penetrating into the headstock of the lathe, whose diameter has been adapted to the material diameter by means of a headstock reducing sleeve.

On the other hand, the fact that the rear of the bar can be perfectly centered, that the latter is guided on a hydrodynamic bearing over the entire length of the guide-bar tube, that a centering ring is provided at the front of the guide-bar tube, and that the bar is guided in the headstock of the lathe by means of reducing sleeves which are dimensioned in function of the bar diameter, allows to avoid any floating of the rotating bars leading to balance errors and vibrations and to the consequent drawbacks.

Finally, it should be mentioned that the feed piston is displaced in practice by oil pressure and that the oil is delivered between the rod of the feed piston and the guiding tube as well as between the latter and the bar to be machined, in order to form a hydrodynamic bearing which supports the feeder rod and the bar to be machined.

I claim:

1. A device for feeding a bar stock to a headstock of a lathe comprising:
   a guide tube having grooves formed on an inner surface;
   a feed piston for feeding said bar stock to said headstock through said guide tube, said feed piston including a front portion and a head portion with grooves formed on an outer surface thereon, and said feed piston having a diameter equal or less than the diameter of said bar stock; and
   a centering traveller having floating elements which partially engage said grooves of said guide tube and partially engage said grooves of said feed piston, whereby said centering traveller locks to the front portion of said feed piston when the head of said feed piston is in said guide tube and locks to said guide tube when the head of said feed piston penetrates into said headstock.

2. The device of claim 1 wherein said centering traveller comprises a sleeve having radial openings in which said floating elements are engaged, said floating elements being capable of moving in the axial direction of said openings.

3. The device of claim 2 wherein said floating elements are balls.

4. The device of claim 3 wherein said balls are distributed in said sleeve in two substantially parallel planes which are substantially perpendicular to the axis of said sleeve, each of said planes comprising a set of a plurality of balls which are each angularly spaced apart by a substantially equal amount.

5. The device of claim 4 wherein each of said planes comprises three balls which are each angularly spaced apart by 120°.

6. The device of claim 1 wherein said guide tube includes a front portion having a stop member which holds said centering traveller when the head of said feed piston penetrates into said headstock to feed said bar stock towards said lathe.

7. The device of claim 3 wherein said feed piston is retracted by vacuum to a rear portion of said guide tube, said center traveller being locked to said guide tube until said head of said feed piston presses upon said centering traveller, said balls passing from said grooves of said guide tube to said grooves of said feed piston thereby releasing said centering traveller from said guide tube and locking said traveller to said feed piston.

8. The device of claim 1 wherein said feed piston further includes a rod, said device further comprising:
   means for producing a hydraulic force for advancing said feed piston towards said headstock; and
   a hydrodynamic bearing provided between said rod and said bar stock and between said bar stock and said guiding tube.

* * * * *